United States Patent [19]
Colin

[11] 3,863,055
[45] Jan. 28, 1975

[54] DOPPLER SCANNING GUIDANCE SYSTEM RECEIVER WITH FOURIER TRANSFORM COMPUTER

[75] Inventor: Jean-Marie Henri Colin, Paris, France

[73] Assignee: International Standard Electric Corporation, New York, N.Y.

[22] Filed: Apr. 27, 1973

[21] Appl. No.: 354,924

[30] Foreign Application Priority Data
Apr. 28, 1972 France .............................. 72.15212

[52] U.S. Cl. ..... 235/150.27, 343/106 D, 343/108 M
[51] Int. Cl. ........................... G06g 7/78, G01s 1/40
[58] Field of Search ............... 235/150.27, 181, 152; 324/79 D, 78 D; 343/16, 100 SA, 113 DE, 106 D, 108 M

[56] References Cited
UNITED STATES PATENTS

| | | | |
|---|---|---|---|
| 3,444,555 | 5/1969 | Hammer | 343/16 |
| 3,568,189 | 3/1971 | Poirier | 343/16 |
| 3,626,419 | 12/1971 | Earp | 343/106 D |
| 3,657,693 | 4/1972 | Graham et al. | 343/113 DE |
| 3,735,403 | 5/1973 | Sykes | 343/16 |
| 3,766,558 | 10/1973 | Kuechken | 343/100 SA |
| 3,778,604 | 12/1973 | Bosc et al. | 235/152 |

*Primary Examiner*—Felix D. Gruber
*Attorney, Agent, or Firm*—William T. O'Neill

[57] ABSTRACT

A Doppler type guidance system in which the frequency shift $fd$ of the signal received at any airborne receiving station with respect to the emitted signal is determined by computing digitally the Fourier transforms X1 and X2 for the two frequencies which are multiples of the scanning frequency, on both sides of $fd$ and then by interpolation from these two values X1 and X2 for determining the center frequency of the received signal spectrum. The frequency thus determined is an accurate analog of the angle of the airborne station with respect to the array normal.

10 Claims, 15 Drawing Figures

DOPPLER SCANNING GUIDANCE SYSTEM RECEIVER WITH FOURIER TRANSFORM COMPUTER

BACKGROUND OF THE INVENTION

1. Field of the Invention

The present invention relates generally to a Doppler Radar Guidance system, and in particular to a Fourier transform computer receiver for a Doppler scanning guidance system.

2. Description of the Prior Art

A guidance system of the type to which the invention relates is described in particular in the article by W. C. Earp, F. G. Overbury and P. Sothcott, entitled "Doppler Scanning Guidance System" published in the periodical Electrical Communication, Vol. 46 (1971) No. 4, Pages 253 to 270. The device described consists basically of a ground transmitter feeding an antenna comprising a linear array of radiating elements. The signal transmitted is applied successively by a commutator to the various radiating elements so as to simulate (for reception at a point located at a distance) a source moving along the array axis.

The signal received at any given point then possesses a phase modulation expressed, in a manner similar to the classical Doppler effect, by a frequency shift of the signal received as a function of the sine of the bearing angle of the receiving point relative to a perpendicular to the array axis. It is therefore necessary to measure this frequency shift at the receiving point and in the process to determine the actual spectral distribution peak of the received signal. Now, this spectrum is a line spectrum whose lines are located at the array scanning frequency and at the multiples of that frequency and therefore there is not necessarily any appreciable power at this spectral distribution peak frequency. Accordingly, the measurement technique should be able to detect the centroid of the cluster of spectral lines, and for example, a digital counter is employed counting the zero crossings of the signal throughout a measurement period including a certain number of antenna scans. Nevertheless, the effect of employing a counter is to quantize the angular measurement into discrete steps. Actually, only a whole number of signal periods can be measured and this results in values of measured angles varying by steps of the order of as much as 1°, for example. This unacceptable situation cannot be remedied by increasing the measurement period, for only integral portions of the numbers of signal periods during each antenna scan are added. In order to alleviate this drawback, it is necessary to slightly modify the phase of the transmitted signal between each antenna scan so as to shift the signal received by a fraction of a cycle at each scan. Thus, if the counter derives an average of the number of zero crossings during a large number of scans, a precise measurement of the frequency shift is obtained without residual steps. Such residual steps occur as a function of the fraction by which the phase is modified at each scan. In accordance with that procedure, substantial complication of the system in order to obtain these successive phase variations is required.

SUMMARY OF THE INVENTION

In accordance with the foregoing recitation of prior art disadvantages, it may be said to be the general object of the present invention to provide a receiver for a Doppler scanning guidance system which does not require the phase variation at each scan and therefore eliminates the equipment complications aforementioned.

According to the invention, there is provided a receiver for a Doppler scanning guidance system comprising a transmitter which transmits on the one hand a reference signal of frequency $f$ and on the other hand, a second signal at a slightly different frequency $f + fo$ by means of a linear array antenna of radiating elements, switched successively according to successive antenna scanning cycles, and a receiver comprising a mixer for supplying a beat signal from the two signals received from the transmitter. Said receiver also includes a counting device for determining the rank of the two scanning frequency multiples bracketing the received second signal frequency shift value, a Fourier transform computer for computing the Fourier transforms X1 and X2 of said beat signal for the frequency values corresponding to said two multiples determined by said counting device, and means for extracting from said values X1 and X2 the value of the receiver bearing angle relative to a perpendicular to said array.

The invention will be better understood and other characteristics will appear from the description hereinafter and from the accompanying drawings.

DESCRIPTION OF THE PREFERRED EMBODIMENT

Figure 1:
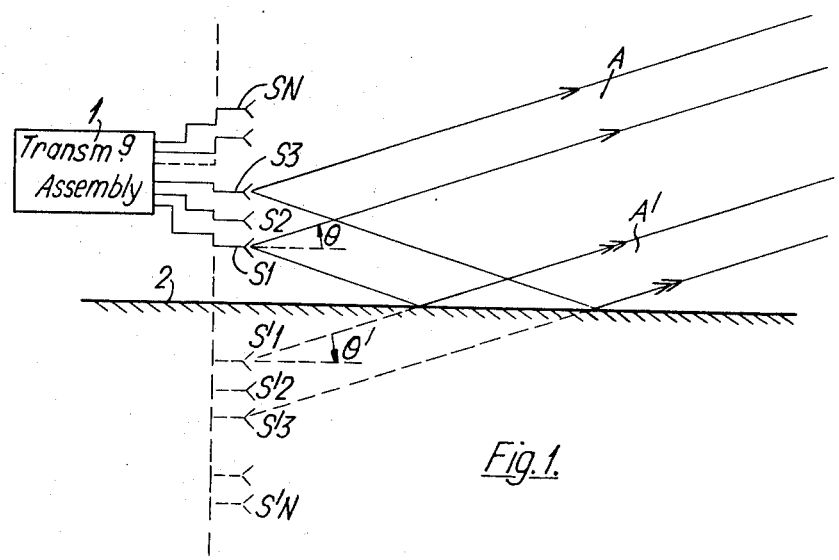
FIG. 1 depicts the transmitting arrangement of a Doppler scanning guidance system.

The transmitting arrangement in a Doppler scanning guidance system as described in the above-mentioned article is shown on FIG. 1. The case illustrated is that of a vertical antenna, perpendicular to the ground 2 as appropriate for derivation of the elevation angle $\theta$ of a remote receiver. This antenna includes a linear array of N radiating elements S1 through SN aligned on a vertical. This antenna is supplied by a commutated transmitter assembly, 1.

Figure 2:
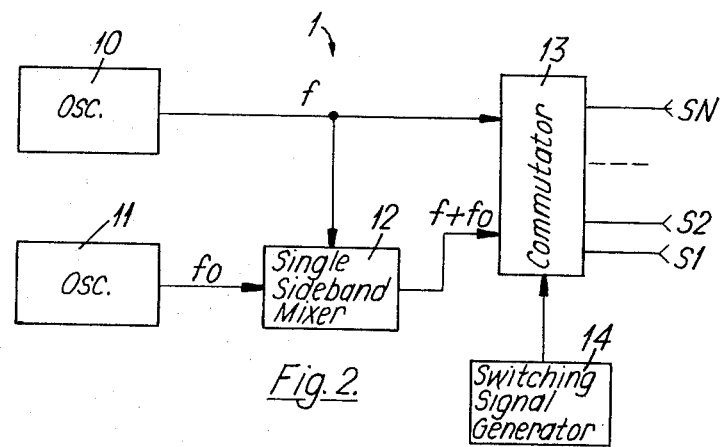
FIG. 2 is a diagram of the transmitter of a system according to FIG. 1.

Referring now to FIG. 2, the transmitter 1 is seen to comprise an oscillator 10 at frequency $f$, an oscillator 11 at frequency $fo$ very small with respect to $f$, a single sideband mixer 12, a commutator 13 and a switching signal generator 14. The signal at frequency $f$ is considered as a reference signal and is transmitted continuously, for example via radiating element S1. The signal at frequency $f + fo$ having a fixed phase as compared to the reference signal is applied successively to elements S1, S2 then S3 . . . which are switched by the commutator 13. The commutator 13 enables successive scanning of antenna elements S1 through SN at a repetition frequency F. Thus, during each scan the antenna is equivalent, as viewed from a given remote reception point, to a point source moving at a constant speed along the array axis. The switching frequency from one element to another is $fr = NF$.

Between each successively energized radiating element, the received signal phase varies by steps $\delta\phi$ owing to the variation in the signal path between two consecutive radiating elements and the given reception point. This is described by Equation 1, as follows:

$$\delta\phi = 2\pi \, (d \sin \theta / \lambda)$$

Eq. (1)

where $d$ is the distance between two consecutive elements and $\lambda$ the wave length of the signal transmitted. If it is assumed that $d = n\lambda$, then $$\delta\phi = 2\pi \, n \sin \theta$$

Eq. (2)

During any given scan, the speed of phase rotation is equal to the Doppler frequency $fd$ which would be produced by a source actually physically moving regularly along the network, and is given by Equation 3, as follows:

$$fd = (fr)(n \sin \theta)$$

Eq. (3)

The frequency $fd$, the frequency shift of the received signal, is thus seen mathematically to be a measurement of the receiver bearing angle $\theta$ relative to the antenna normal.

Between the end of each scan, where the phase variation of the signal received from SN with respect to the reference signal is $N\delta\phi$ and the start of the following scan where the phase variation of the signal received from S1 with respect to the reference signal is nil (the two signals being transmitted by the same element), a phase jump or transient $\Delta\delta$ occurs, described as follows:

$$\Delta\phi = 2\pi \, nN \sin \theta - 2k \, \pi$$

Eq. (4)

In Equation 4, $0 < \Delta\phi < 2\pi$ and $k$ is a positive integer.

The signal received at the carrier frequency $fo + f$ is mixed with the reference signal to give a beat signal at carrier frequency $fo$ having a frequency $fo + fd$. By means of that process, it is possible to eliminate the influence of the additional Doppler frequency introduced owing to the movement of the receiver itself, for instance, as it is carried in an aircraft.

If the frequencies $fo + f$ and $f$ of the signals received are sufficiently close, the target motion Doppler effect on the two signals is the same and is cancelled out in the beat signal obtained.

Figure 3A:
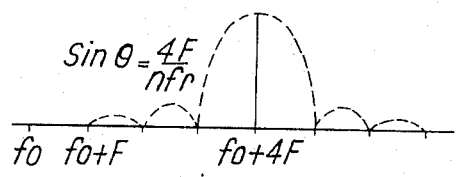
FIGS. 3(a) to 3(f) represent the signal spectra received in a simplified case together with the corresponding phase variations of the transmitted signal for different values of the reception point bearing angle, as identified.
Figure 3B:
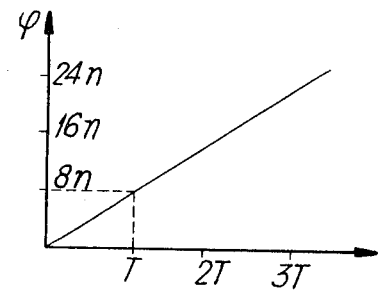
Figure 3C:
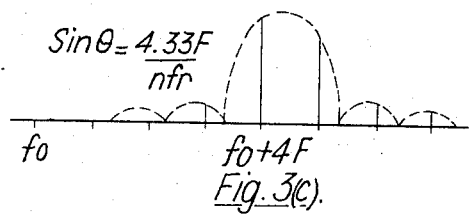
Figure 3D:
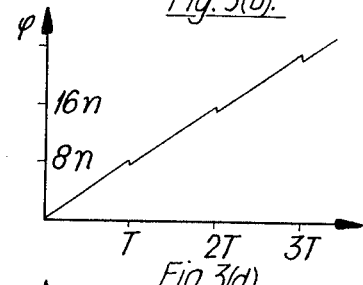
Figure 3E:
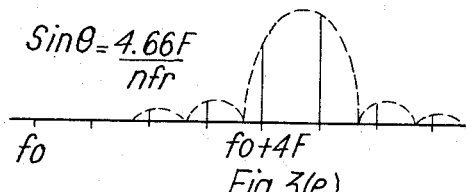
Figure 3F:
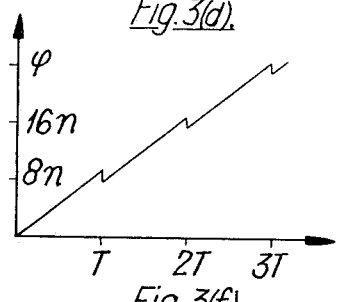

FIGS. 3(a), 3(c) and 3(e), represent the signal spectrum centered on $fo + fd$ for different values of the bearing angle. FIGS. 3(b), 3(d) and 3(f) show the phase variation $\phi$ of the received signal as compared to the reference signal, $T = 1/F$ being the antenna scanning period. The received signal is to be understood to be repetitive at frequency F.

The spectrum envelope is centered on $fo + fd$ and has the form $\sin x/x$ with null values $1/T$ apart on either side of the spectrum center, assuming equal amplitude distribution on all the radiating elements.

If, as is the case, the signal is processed during a time $T' = MT$ ($M$ being an integer) large compared to $T$, the phase variation versus time is, as shown in FIGS. 3(b), 3(d) and 3(f), the sum of a continuous phase variation at a frequency (N $\delta\phi - \Delta\phi/2\pi T) = kF$ and a sawtooth modulation, the latter at a repetition frequency F and amplitude $\Delta\phi$. Thus the spectrum comprises a principal line at $fo + kF$ and lateral lines spaced by F. It can therefore be seen from FIG. 3 that there is not necessarily a spectral line at frequency $fo + fd$.

Generally, in order to reduce the side lobes, the amplitudes applied to the various antenna radiating elements are weighted, for example according to a truncated Gauss law. This has the effect of widening the main lobe while greatly reducing the side lobes.

As shown on FIG. 1, it is also necessary to take into account the reflected beam A' appearing to come from an image of the antenna with respect to the reflecting ground surface. This is expressed at the remote receiver as a variation effect on the reference signal amplitude, due to the interference of the direct and reflected beams. This amounts to superimposition on the direct signal spectrum centered on $fo + fd$ and constituting reproduced discrete frequencies differing from $fo + fd$ by a multiple of $fr$ (for example $fo - fr + fd$, $fo + fr + fd$ etc . . .), of a spectrum due to the reflected signal. This reflected signal spectrum is centered on $fo + f'd$, where $f'd$ is equal to $-fd$ in the case of a reflecting plane perpendicular to the antenna. This is true since the equivalent reflected (virtual) source is moving in an opposite direction to the mobile source equivalent to the antenna for the direct beam and since thus the angle $\theta'$ is equal to $-\theta$. The reflected signal spectrum centered on $fo - fd$ is naturally produced around $fo - fr - fd$, $fo + fr - fd$ etc . . .

Figure 4:
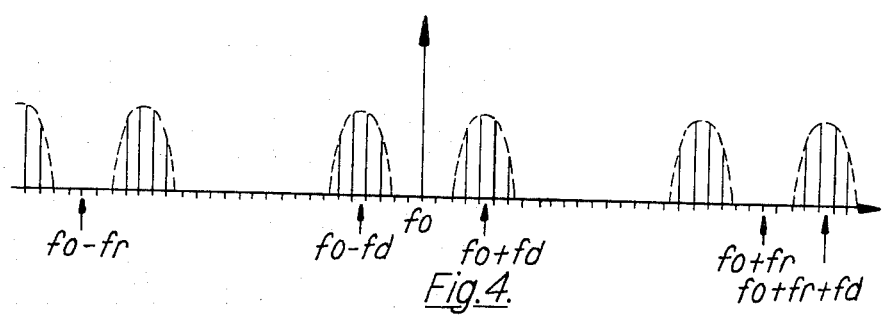
FIG. 4 shows the spectrum of the received signal.

The spectrum so obtained is represented approximately on FIG. 4 assuming $fd < fr/2$ and only the central part of the spectrum may then be retained by a passband filter $fo \pm fr/2$.

In the general case in which a reflecting surface to be considered is not perpendicular to the antenna axis but makes an angle $\alpha$ with it, the spectrum is centered on $fo + f'd$, where $f'd = nfr \sin \theta'$ with $\theta' = \pi - 2\alpha - \theta$. This spectrum can be disturbing if it is centered around a frequency close to $fo + fd$, as shown in (b) in FIG. 5. The most disturbing case is that at which $\theta$ is below $\pi - 2\alpha$, $\alpha$ being itself below $\pi/2$ (case of a large obstacle close to the antenna).

Figure 5:
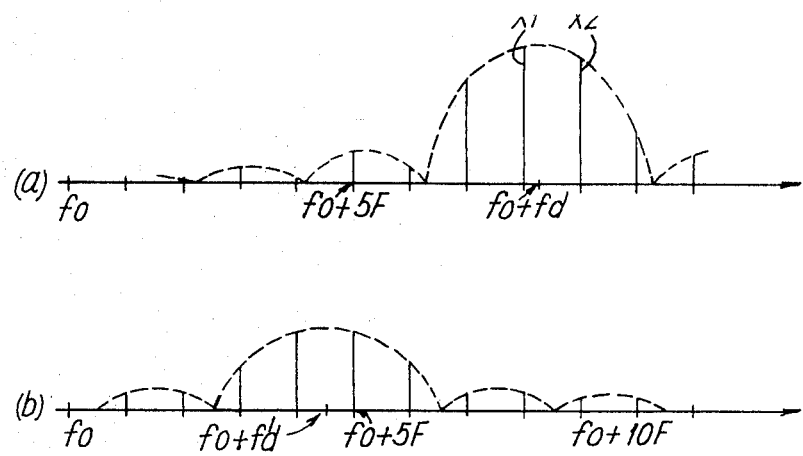
FIGS. 5(a) and 5(b) depict the spectra of signals received directly and by reflection, respectively.

The spectrum (a) on FIG. 5 represents the direct signal spectrum. It is clear that in order for the measurement of $fd$ not to be distorted, it is necessary to have at least a predetermined minimum spacing between $fd$ and $f'd$.

The principle and characteristics of the basic scanning guidance system being known as described, the problem to be solved will be seen to be the measurement of the frequency shift $fd$ corresponding to the direct signal spectrum center in view of the fact that there is not necessarily a spectral line at this frequency.

According to the invention, the spectrum center is determined by calculating the Fourier transform for the two frequency values multiple of F, $kF$ and $(k+1)F$, bracketing the value $fd$. Let X1 and X2 be the values of this transform pair. The exact bearing angle of the receiver can then be determined by determining the position of the frequency $(fo + fd)$ spectrum center with respect to the positions of the said multiples of F, from the known form of the spectrum envelope.

Figure 6:
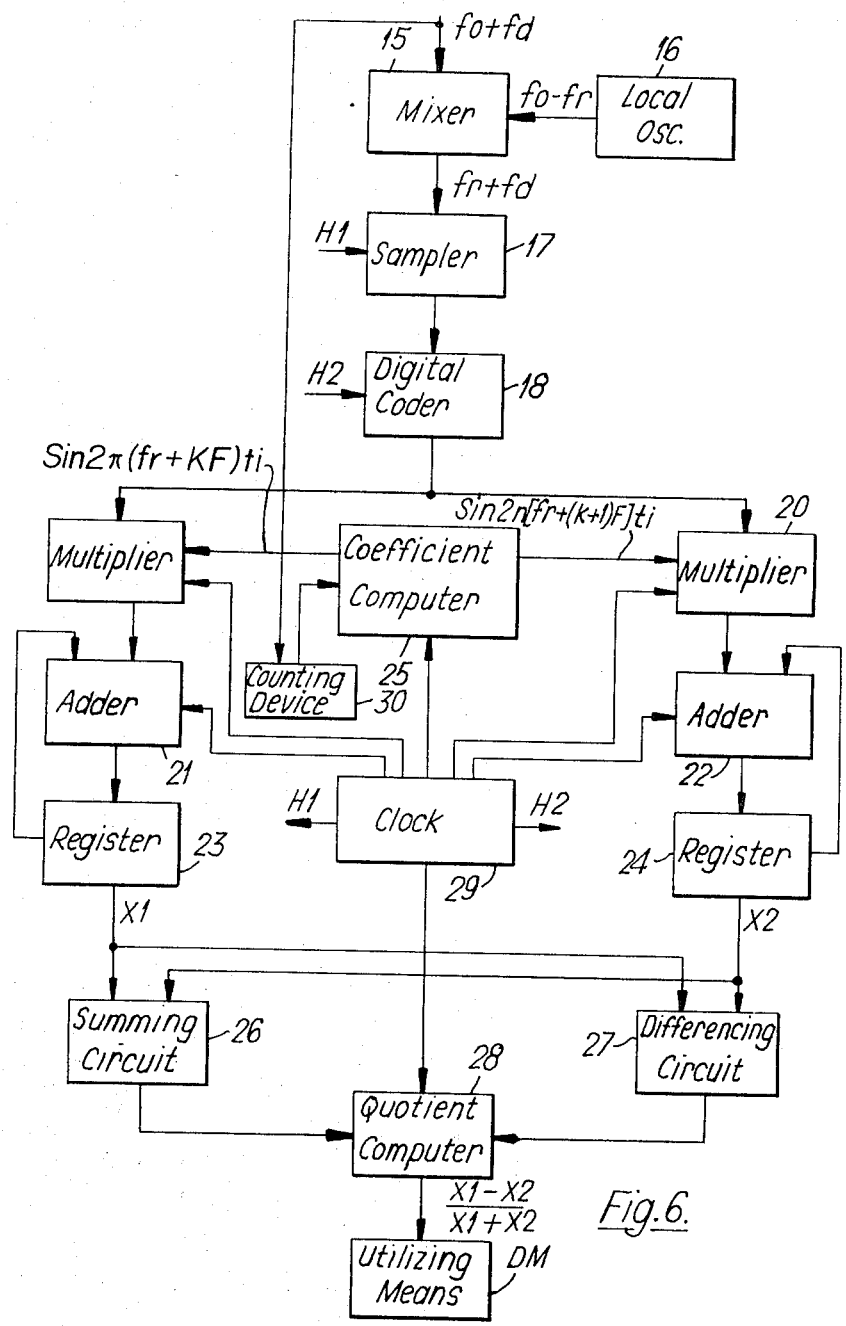
FIG. 6 is a diagram of a first embodiment of the receiver according to the invention.

FIG. 6 shows a first embodiment of the receiver according to the invention in which the calculation of the Fourier transform is made digitally on the beat signal frequency translated from carrier frequency $fo$ to a carrier $fr$, which, owing to the fact that $fd$ is assumed to be lower than $fr/2$, enables the Fourier transforms to be calculated, preserving the sign, for frequency values $fr + kF$ and $fr + (K+1)F$ according to the equations:

$$X1 = \sum_{0}^{m} U(ti) \sin 2\pi (fr + kF) ti \qquad \text{Equation (5)}$$

$$X2 = \sum_{0}^{m} U(ti) \sin 2\pi [fr + (K+1)F] ti \qquad \text{Equation (6)}$$

In Equations 5 and 6, $U(ti)$ is the value of the signal sample at time $ti$. The sample frequency which should be at least equal to $3fr$ is selected for reasons of convenience as equal to $4fr$ and accordingly, $ti = i/4fr$ and $m = 4fr\,T'$.

This being so, the receiver shown on FIG. 6 includes a mixer 15 receiving the beat signal at frequency $fo + fd$ and a signal at frequency $fo - fr$ supplied by a local oscillator 16. The signals at frequency $fr + fd$ are sampled by a sampler 17 supplied with sampling signals H1 at frequency $4fr$ from a clock circuit 29. Each sample is then put into digital form by a coder 18 receiving the clock signals H2. These coded samples are then sent into two channels for computing respectively X1 and X2. It is not necessary to store them since the calculation is made directly.

The coded samples are sent to two multipliers 19 and 20 which respectively receive the successive values $\sin 2\pi (fr + kF) ti$ and $\sin 2\pi [fr + (k+1)F] ti$ from a coefficient computer 25 and which carry out the products within the equations (1) and (2) above. The computer 25 receives rank $k$ of the multiple of F closest to $fd$ supplied to it by a counting device 30 of any known type counting the number of zero crossings of the received signal. A suitable approach to element 30 is described in U.S. patent application Ser. No. 91,649 filed Nov. 23, 1970, entitled "Frequency Measuring Method", now U.S. Pat. No. 3,774,212.

In each channel, an adder (21,22) followed by a register (23,24) the whole being looped, makes the sum of the $m$ successive products and then produces the value respectively of X1 and X2. These values are sent in the example shown, to two circuits 26 (summing circuit) and 27 (differencing circuit), carrying out respectively, the sum X1 + X2, and the difference X1 − X2. A quotient computer 28 receives the outputs of 26 and 27 and produces the ratio $(X1 - X2)/(X1 + X2)$. This ratio is then sent to receiver bearing angle displaying and/or utilizing means DM. Suitable clock signals are sent to the adders 21 and 22 and the quotient computer 28.

To calculate $fd$, the form of the spectrum envelope $(\sin x/x)$ has been approximated by an isosceles triangle. In these conditions, it is easily shown that $X1 - X2/X1 + X2$ is proportional to $fd - (k + 0.5)F$. Knowing the value of the predetermined angle corresponding to $(k + 0.5)F$, the value $(X1 - X2/X1 + X2)$ can be displayed directly utilizing a suitable scale, in the form of an angular deviation with this predetermined angle.

The value of a given angle can also be preset and the angular deviation between the receiver bearing angle and the said preset value displayed. That arrangement can be useful for an aircraft guidance system, for example.

Figure 7:
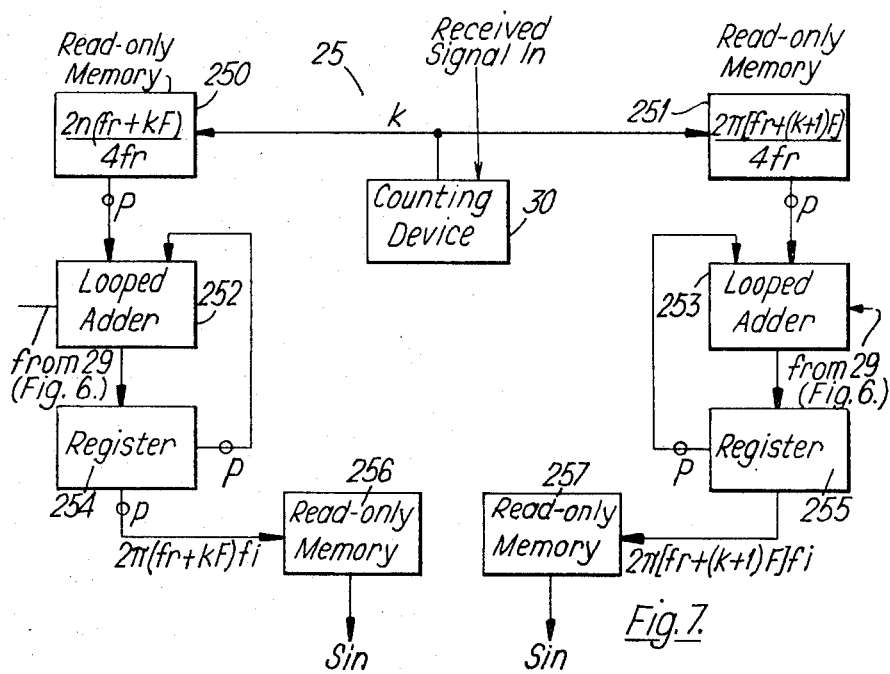
FIG. 7 represents the diagram of an element of the receiver of FIG. 6.

FIG. 7 shows a possible diagram for the sinusoidal coefficient computer 25. For each channel, it includes read-only memories 250 and 251, addressed by the value $k$ supplied by Phase Increment Synchronizer 30 and supplying the phase increment respectively $2\pi(fr + kF)/4fr$ and $2\pi[fr + (k+l)F]/4fr$. This phase increment is added regularly to the sinusoidal coefficient phase at the sampling signal rate by means of looped adders 252 and 253 and registers 254 and 255, supplying the successive phases $2\pi(fr + kF) ti$ and $2\pi[fr + (k+1)F]ti$ increased at each sampling instant by the corresponding phase increment. These phase values are used as an address for each of read-only memories 256 and 257, which supply the corresponding sinusoidal coefficient in each channel.

Figure 8:
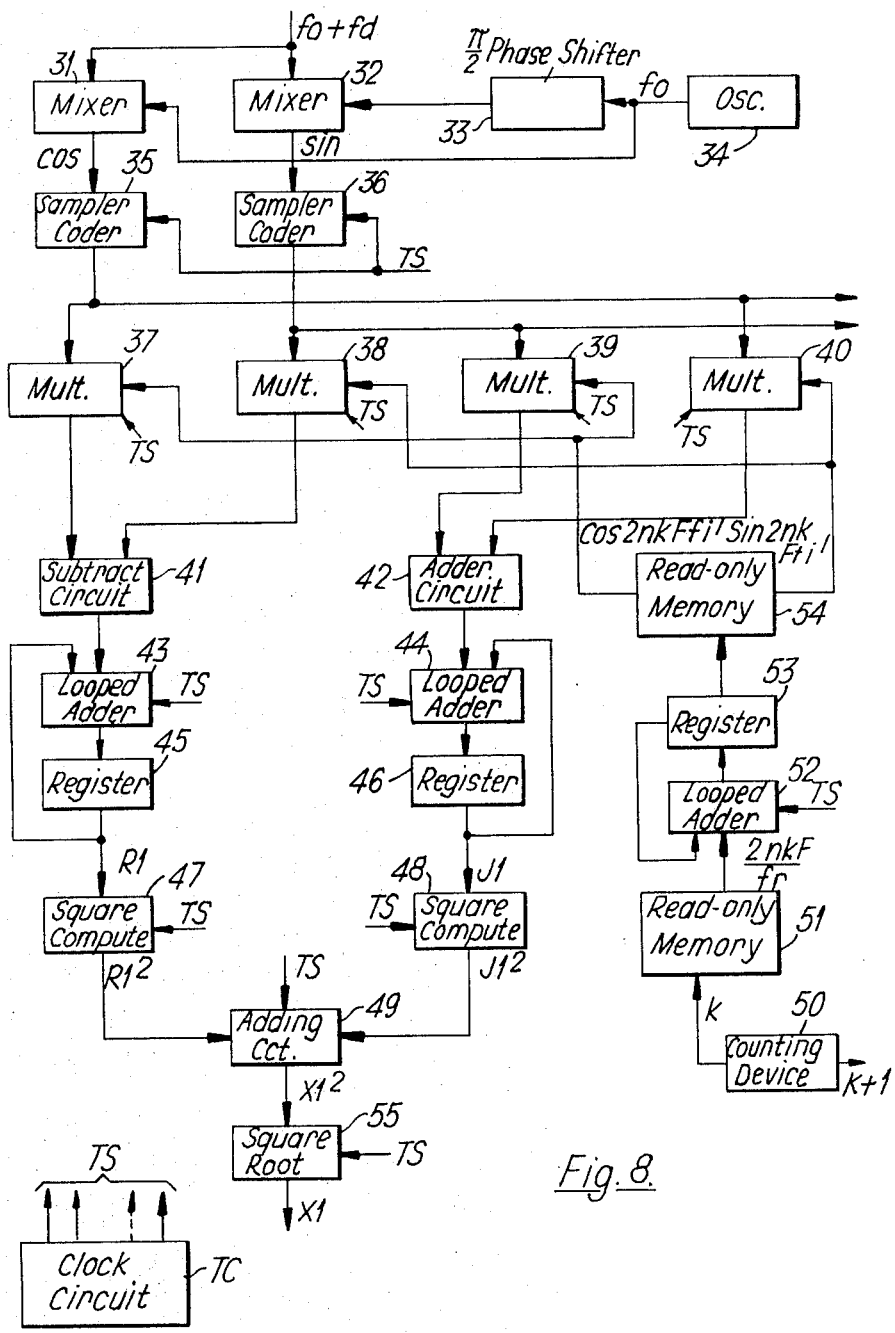
FIG. 8 is a partial diagram of an additional embodiment of the receiver according to the invention.

FIG. 8 shows diagrammatically an alternative embodiment. Only the computing channel for X1 has been shown, it being understood the channel for X2 is identical. A frequency translation is made on the beat signal by comparing it to a local signal at frequency $fo$. In these conditions it is known that, in order to calculate the Fourier transform, it is necessary to utilize the components in phase and phase quadrature of the translated signal for computing the real and imaginary parts of the Fourier transform and obtaining it according to the equation:

$$X1^2 = \left[\sum_{0}^{m'}(Uc(t'i)\cdot\cos 2\pi kFt'i - Us(t'i)\cdot\sin 2\pi kFt'i)\right]^2$$
$$+ \left[\sum_{0}^{m'}(Us(t'i)\cdot\cos 2\pi kFt'i + Uc(t'i)\cdot\sin 2\pi kFt'i)\right]^2$$
$$= R1^2 + J1^2 \qquad \text{Equation (7)}$$

In Equation (7), $Uc(t'i)$ and $Us(t'i)$ are the values at time $t'i$ of the samples of the translated signals respectively in the cosine and sine channels. The sampling frequency is selected equal to $fr$ ($fd < fr/2$) and therefore one has: $t'i = i/fr$ and $m' = fr(T')$.

An identical equation in which $k$ is replaced by $k + 1$ is employed for X2.

This being so, the beat signal at frequency $fo + fd$ is sent to two mixers 31 and 32 which receive, directly or through a phase shifter 33 of $\pi/2$, a local reference signal at frequency $fo$, supplied by oscillator 34, and which supply the signals, respectively, of the cosine and sine channels at frequency $fd$. These signals are sent respectively to two sampler-coders 35 and 36 receiving the clock signals TS from a clock circuit TC.

The coded samples are applied to multipliers 37 and 40 for the samples of the cosine channel and to multipliers 38 and 39 for the sine channel. The multipliers 37 and 39 receive the coefficients $\cos 2\pi kFt'i$ and the multipliers 38 and 40 receive the coefficients $\sin 2\pi kFt'i$. These coefficients are calculated by a coefficient computer identical to that in FIG. 7 which includes a read-only memory 51 addressed by value $k$ supplied by a counting device 50 and supplying the phase increment $2 kf/fr$, a looped adder 52 and register 53 and a read-only memory 54.

The multipliers 37 to 40 transmit the elementary products of the Equation (7) to two computing channels, respectively of the real part R1 and the imaginary part J1 of the Fourier transform X1. Each channel comprises an adding or subtracting circuit, 41 or 42, summing circuits comprising looped adder 43 and 44, and registers 45 and 46 and square computing circuits 47 and 48, which supply the values $R1^2$ and $J1^2$. An adding circuit 49 then supplies the value of $X1^2$ from which a circuit 55 extracts the square root. The various clock signals TS are sent to the multipliers 37 through 40, to the Loop Adders 43, 44 and 52, and to circuits 47 through 49 and 55.

The sine and cosine samples and the value $k + 1$ are also sent to the computing channel for X2 (not illustrated), and it is again understood that these are identical to the computing channel for X1.

The values X1 and X2 can be used, as in the case of FIG. 6, to calculate $(X1 - X2)/(X1 + X2)$ and the angular deviation by approximating the spectrum envelope curve to an isosceles triangle. But it is also possible in both cases to make more exact calculations by means of the circuit shown on FIG. 9.

Figure 9:
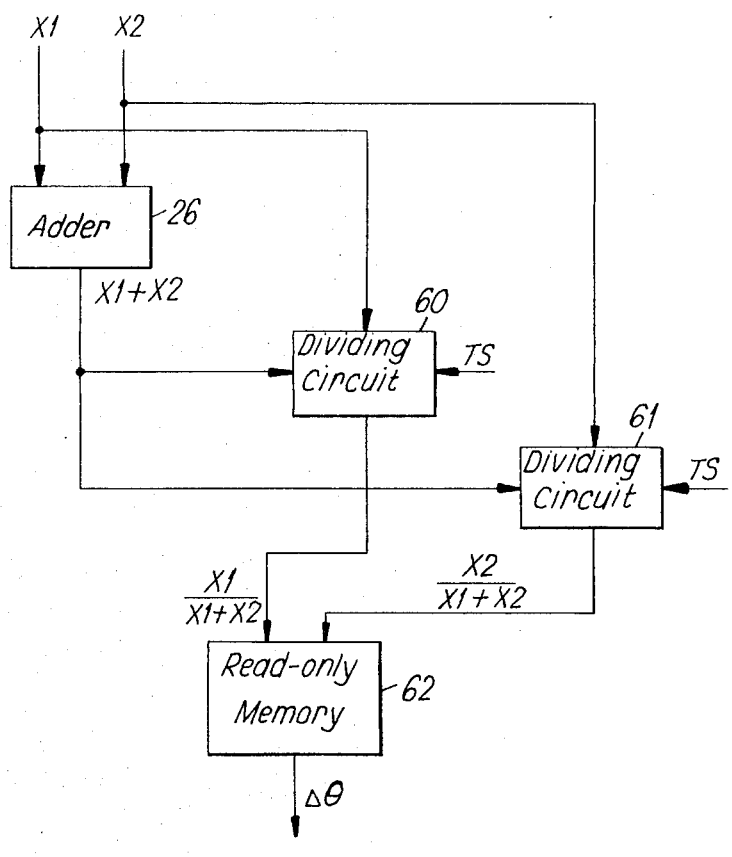
FIG. 9 shows yet another alternative embodiment of the receiver according to the invention.

Referring now to FIG. 9, the nature and function of this more accurate circuit will be described. From the values of X1 and X2, the normalized values $X1/(X1 + X2)$ and $X2/(X1 + X2)$ are computed by means of adding circuit 26 and dividing circuits 60 and 61. These values are utilized to address a read-only-memory 62 which directly gives the angular deviation $\Delta\theta$ between the correct bearing angle of the receiver relative to the transmission antenna as a function of the angle corresponding to a frequency shift $(k + 0.5) F$ for example.

In both methods of calculation, it is to be observed that the quotient computer circuits work at very low speeds, comparable to the frequency of information supply (data rate) in the system, $1/T'$, and are therefore very simple.

It can also be observed that instead of supplying the value $k$ from a counting device, it is possible to supply it as from a preset of an angle $\theta$ by the operator.

The receiver of the invention may thus be described as being of matched filter type and it therefore offers the advantages of such receivers together with the advantages of digital processing techniques.

Of course, the embodiments described are not limitative of the invention, the drawings and this description being illustrative and typical only.

What is claimed is:

1. A receiving system for use at a remote station in a Doppler scanning guidance system which includes a ground beacon having a transmitter, a linear array of antenna elements, and commutator means for successively energizing said antenna elements from said transmitter at a frequency $f + fo$, said array also being arranged to transmit a reference signal at a frequency $f$, and wherein said receiver system operates to determine a spatial angle of said remote station with respect to a predetermined reference line extending from said array, the combination comprising:

means within said receiver system for receiving and deriving a beat signal between said $f$ and $(f + fo)$ signals, said receiving system inherently receiving said signals by direct and reflected paths;

counting means responsive to said transmitted signal for determining the frequencies of the two multiples of the repetition frequency of said ground beacon commutation, said two multiples being the ones bracketing the value of the Doppler frequency resulting from said ground beacon array commutation, received on the said direct path signal;

a Fourier transform computer responsive to said beat signal for deriving a pair of Fourier transforms thereof corresponding to said two multiples as determined by said counting means;

and angle computing means responsive to said transforms for determining an intermediate value representative of said spatial angle of said remote station with respect to said predetermined reference line.

2. A system in accordance with claim 1, further defined in that said predetermined reference line is the normal to said array.

3. Apparatus according to claim 2 in which said angle computing means include summing and dividing circuits for computing the quantity $(X1 - X2)/(X1 + X2)$, where X1 and X2 are said transform pair, to provide a value substantially proportional to the angular deviation between the angle of said remote station and the angle corresponding to a frequency shift median between said multiples.

4. Apparatus according to claim 2 in which said angle computing means includes summing and dividing circuits for supplying the values $X1/(X1 + X2)$ and $X2/(X1 + X2)$, a read-only memory addressed by said values for supplying a signal representative of the angular deviation between the angle of said remote station and the angle corresponding to a frequency shift median equal to one of said multiples or between said multiples.

5. Apparatus according to claim 3 in which said angle is the bearing angle.

6. Apparatus according to claim 4 in which said angle is the bearing angle.

7. Apparatus according to claim 3 in which said Fourier transform computer comprises means for demodulating said beat signal to produce an audio frequency beat signal, sampling and coding circuits for encoding said beat signal into digital form and in which said angle computing means includes circuits for performing summing and dividing operations digitally.

8. Apparatus according to claim 4 in which said Fourier transform computer comprises means for demodulating said beat signal to produce an audio frequency beat signal, sampling and coding circuits for encoding said beat signal into digital form and in which said angle computing means includes circuits for performing summing and dividing operations digitally.

9. Apparatus according to claim 7 wherein said Fourier transform computer includes a coefficient computing circuit which comprises a read-only memory addressed by the rank supplied by said counting device and supplying a corresponding phase increment, a looped addition circuit responsive thereto for supplying, successively, the phase values corresponding to said coefficients and a second read-only memory receiving said phase values and supplying in response said coefficients.

10. Apparatus according to claim 8 wherein said Fourier transform computer includes a coefficient computing circuit which comprises a read-only memory addressed by the rank supplied by said counting device and supplying a corresponding phase increment, a looped addition circuit responsive thereto for supplying, successively, the phase values corresponding to said coefficients and a second read-only memory receiving said phase values and supplying in response said coefficients.

* * * * *